United States Patent [19]
Tunningley et al.

[11] Patent Number: 4,878,260
[45] Date of Patent: Nov. 7, 1989

[54] COMBINATION TOOL

[76] Inventors: William A. Tunningley; Martha A. Tunnungley; Emanuel M. Pupulidy, all of 503 Valasquez Dr., Osprey, Fla. 33559

[21] Appl. No.: 237,640

[22] Filed: Aug. 26, 1988

Related U.S. Application Data

[63] Continuation of Ser. No. 59,537, Jun. 8, 1987, abandoned.

[51] Int. Cl.$^4$ ............................................. B25B 7/22
[52] U.S. Cl. ..................................... 7/129; 30/164.95
[58] Field of Search ................. 30/164.95; 7/127, 129, 7/132; 225/96.5; 125/23 R

[56] References Cited

U.S. PATENT DOCUMENTS

| | | | |
|---|---|---|---|
| 522,471 | 7/1894 | Kohler | 7/129 |
| 862,049 | 7/1907 | Booth | 30/164.95 X |
| 4,215,472 | 8/1980 | Raven | 30/164.95 |
| 4,224,738 | 9/1980 | Magewick et al. | 30/164.95 |
| 4,528,752 | 7/1985 | Benedict | 30/164.95 |

FOREIGN PATENT DOCUMENTS

| | | | |
|---|---|---|---|
| 18131 | 5/1882 | Fed. Rep. of Germany | 7/129 |
| 2040793 | 9/1980 | United Kingdom | 30/164.95 |

*Primary Examiner*—Debra Meislin
*Attorney, Agent, or Firm*—Gifford, Groh, Sheridan, Sprinkle and Dolgorukov

[57] ABSTRACT

A combination tool includes a pair of handles and attached jaws pivotable as to each other, with a finger rest mounted to one jaw and a cutter wheel pivotally mounted to the other jaw. A tapper is mounted to one handle opposite a jaw and the handles are covered with plastic sleeves.

4 Claims, 1 Drawing Sheet

U.S. Patent   Nov. 7, 1989   4,878,260
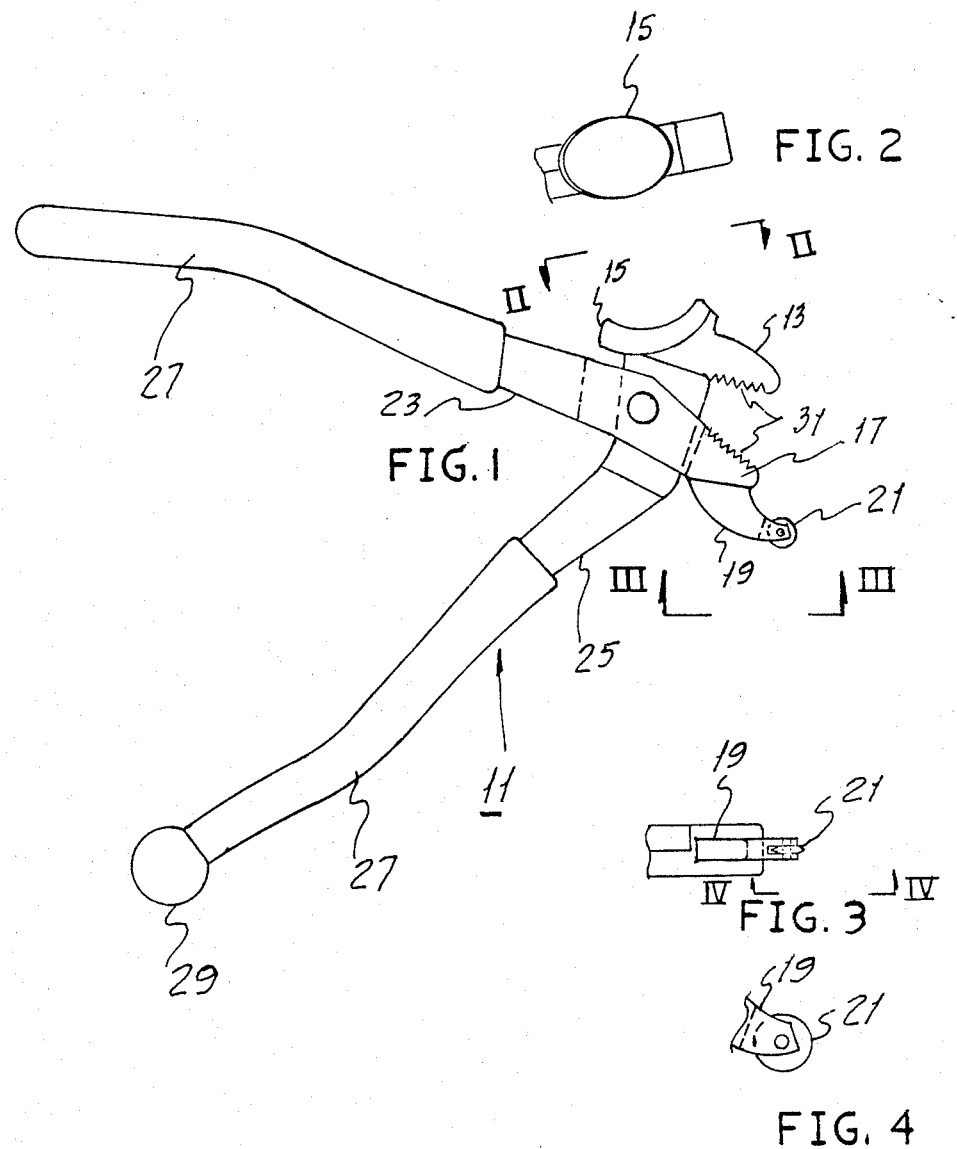

COMBINATION TOOL

This is a continuation of application Ser. No. 059,537 filed June 8, 1987 now abandoned.

BACKGROUND OF THE INVENTION

1. Field: The present invention pertains to tools and, more particularly, to a combination tool that is useful for cutting and for forming glass.

2. Prior Art: Combination tools are depicted in the prior art for use in working pipe. One such patent is U.S. Pat. No. 522,471 to Kohler, and another such patent is U.S. Pat. No. 890,327 to Blum. U.S. Pat. No. 548,516 to Caldwell depicts a combination tool that performs several functions. None of these patents, however, is useful for cutting and forming glass.

SUMMARY OF THE INVENTION

A combination tool in accordance with the present invention comprises a pair of members pivotably connected together; each member comprising a handle and a jaw; a finger rest is mounted to one jaw and a cutter member is pivotally mounted to the other jaw; a tapper member is mounted to one handle; and means covering each handle is for easy gripping the tool.

A principal object of the invention is to provide a combination tool that includes elements in one tool that would normally be combined in several tools for cutting and shaping glass.

Other objects and advantages of the present invention will be come apparent to those skilled in the art when the following description of the best mode contemplated at present for practicing the invention is read in conjunction with the accompanying drawing.

BRIEF DESCRIPTION OF THE DRAWING

In the Drawing

FIG. 1 is a plan view of a combination tool in accordance with a preferred embodiment of the invention;

FIG. 2 is a view along line II—II of FIG. 1;

FIG. 3 is a view along line III—III of FIG. 1; and

FIG. 4 is a view along line IV—IV of FIG. 3, at an enlarged scale.

DETAILED DESCRIPTION

Referring to FIG. 1 of the drawing, a combination tool in accordance with the invention comprises a conventional pair of pliers 11 to which is added on one jaw 13 a curved member 15 that serves as a finger rest. On the other jaw 17 is a projection 19 to which is mounted rotatably a glass cutter wheel 21.

The pliers 11 have conventional handles 23,25, but that are coated, as at 27, with a suitable plastic material, and on the end of one handle 25 there is a ball or tapper 29.

The jaws 13,17 each have a straight line of teeth 31 that facilitates nibbling and shaping a piece of glass along a line scribed thereon by the cutter wheel 21.

In using the combination tool of the invention, a person grasps in one hand the pair of handles 23,25 and places a forefinger on the finger rest 15. The cutter wheel 21 may then be drawn across a glass surface along a designated line thereby scribing the glass. The tapper 29 may then be applied to the underside surface of the glass beneath the scribed line causing the glass to break along the scribed line.

In some instances, when a figured line is scribed on the glass, the teeth of the jaws 13,17 may be used to nibble away parts of the glass thereby conforming the glass to the desired shape.

Those skilled in the art will recognize many features and advantages of the present invention, among which are:

That the combination tool of the present invention is an instrument that allows a glazier to perform his occupation using only one such combination tool; and That the combination tool of the present invention is a simple instrument that is inexpensive and yet is very versatile.

Although the invention has been described herein with a certain degree of particularity, it is understood that other modifications may be made therein without departing from the scope of the present invention as defined by the following claims.

What is claimed is:

1. A combination tool for scribing and separating glass, comprising:

a first elongated member having a longitudinal axis having a first end and a second end; a second elongated member having a longitudinal axis having a first end and a second end;

wherein said first member comprises an elongated intermediate section having a longitudinal axis, said intermediate section being pivotally secured to said second member so that said first and second members pivot with respect to a preset axis;

said first end of said first member includes a handle portion and a tapper ball;

a finger rest on said first member between said intermediate section and said second end and an upper serrated jaw attached to said second end of said first member wherein said finger rest comprises a curved member having a width along said axis greater than the width of said first member along said axis at its connection with said finger rest;

said first end of said second member includes a handle portion; and said second end of said second member includes a rotatably mounted cutter wheel and a lower serrated jaw;

wherein said lower serrated jaw at said second end of said second member lies in a plane substantially parallel to the longitudinal axis of said second member;

said axis of said intermediate member extending laterally outwardly at an acute angle with respect to the axis of said first member;

wherein said upper serrated jaw lies in a plane substantially perpendicular to the longitudinal axis of said midsection.

2. A combination tool according to claim 1 wherein the width of said finger rest along said axis is greater than the combined width along said axis of said first and second member at the point said first and second members are pivotally connected.

3. A combination tool according to claim 1 wherein said finger rest comprises a solid curved plate member.

4. A combination tool according to claim 1 wherein said cutter wheel is mounted on a projection extending from said second end of said second member.

* * * * *